United States Patent
O'Donnell et al.

(10) Patent No.: US 11,213,703 B2
(45) Date of Patent: Jan. 4, 2022

(54) TOOL AND METHOD FOR INSTERTION OF A PROBE FOR FIT-TESTING FILTERING FACEPIECES

(71) Applicants: Conor Patrick O'Donnell, Tulsa, OK (US); W. John Tisch, North Bend, OH (US); Victor Shawn Hines, Brookville, IN (US)

(72) Inventors: Conor Patrick O'Donnell, Tulsa, OK (US); W. John Tisch, North Bend, OH (US); Victor Shawn Hines, Brookville, IN (US)

(73) Assignee: AccuTec-IHS, Inc., Tulsa, OK (US)

( * ) Notice: Subject to any disclaimer, the term of this patent is extended or adjusted under 35 U.S.C. 154(b) by 386 days.

(21) Appl. No.: 15/928,006

(22) Filed: Mar. 21, 2018

(65) Prior Publication Data
US 2019/0290944 A1    Sep. 26, 2019

(51) Int. Cl.
*B23P 19/00* (2006.01)
*A62B 27/00* (2006.01)
*G01D 11/30* (2006.01)

(52) U.S. Cl.
CPC .............. *A62B 27/00* (2013.01); *G01D 11/30* (2013.01)

(58) Field of Classification Search
CPC ....... B25B 11/00; B25B 11/02; B25B 11/002; B25B 9/00; B25B 3/00; B25B 5/00
See application file for complete search history.

(56) References Cited

U.S. PATENT DOCUMENTS

| 5,915,932 | A | * | 6/1999 | Nabity | F04B 43/1276 |
|---|---|---|---|---|---|
| | | | | | 417/477.1 |
| 5,988,236 | A | * | 11/1999 | Fawcett | G01N 35/1065 |
| | | | | | 141/130 |
| 6,125,845 | A | | 10/2000 | Halvorsen et al. | |
| 6,499,168 | B1 | * | 12/2002 | Anderson | B25B 23/12 |
| | | | | | 7/165 |
| 2016/0067531 | A1 | | 3/2016 | Pariseau et al. | |
| 2018/0211753 | A1 | * | 7/2018 | Smith | B25B 23/12 |
| 2019/0290944 | A1 | * | 9/2019 | O'Donnell | G01D 11/30 |

\* cited by examiner

*Primary Examiner* — Lee D Wilson
(74) *Attorney, Agent, or Firm* — Dane C. Butzer

(57) ABSTRACT

A device that can be used to insert a probe into a filtering facepiece for fit testing. The device preferably includes a holder for the probe; a handle to apply force directly or indirectly to the probe; magnets that assist with alignment of the holder and the handle during a process of inserting the probe into the filtering facepiece; and a spring that facilitates separation of the holder and the handle after insertion of the probe into the filtering facepiece. The holder may further include a puncturing device to facilitate insertion of the probe. The holder and the handle preferably are separate elements positioned opposite each other to apply force to the probe. In some aspects, the holder includes a piston for driving the probe into the filtering facepiece. The spring may surround the piston. The handle preferably includes a recess capable of holding a fastener for the probe. The magnet(s) may be of any shape and type, but preferably are torus shaped neodymium magnets. Also, associated techniques.

8 Claims, 5 Drawing Sheets

TOOL AND METHOD FOR INSTERTION OF A PROBE FOR FIT-TESTING FILTERING FACEPIECES

CROSS-REFERENCE TO RELATED APPLICATION

Not Applicable

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISK APPENDIX

Not Applicable

BACKGROUND

The present disclosure generally relates to a tool used to attach probes to filtering face-pieces for fit-testing, as well as associated techniques.

SUMMARY

Aspects of the subject technology include a device that can be used to insert a probe into a filtering facepiece for fit testing. The device preferably includes a holder for the probe; a handle to apply force directly or indirectly to the probe; magnets that assist with alignment of the holder and the handle during a process of inserting the probe into the filtering facepiece; and a spring that facilitates separation of the holder and the handle after insertion of the probe into the filtering facepiece. The holder may further include a puncturing device to facilitate insertion of the probe. The holder and the handle preferably are separate elements positioned opposite each other to apply force to the probe. In some aspects, the holder includes a piston for driving the probe into the filtering facepiece. The spring may surround the piston. The handle preferably includes a recess capable of holding a fastener for the probe. The magnet(s) may be of any shape and type, but preferably are torus shaped neodymium magnets.

Aspects of the subject technology also included associated techniques.

This brief summary has been provided so that the nature of the invention may be understood quickly. Additional steps and/or different steps than those set forth in this summary may be used. A more complete understanding of the invention may be obtained by reference to the following description in connection with the attached drawings.

DETAILED DESCRIPTION

Figure 1:
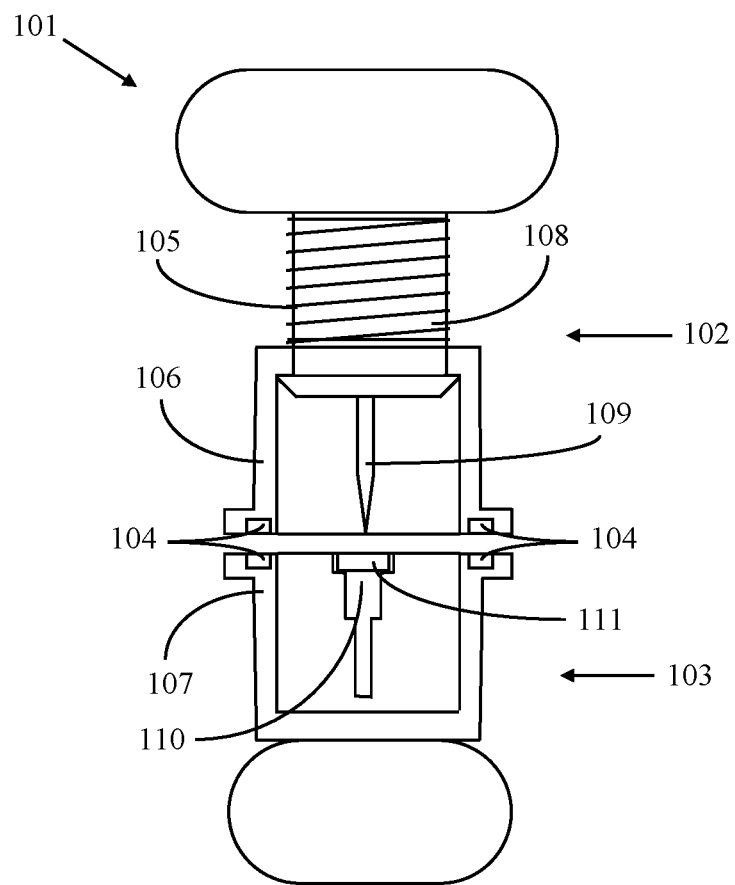
FIG. 1 illustrates an example of a device that can be used to insert a probe into a filtering facepiece for fit testing according to aspects of the subject technology.

Briefly, techniques according to aspects of the subject technology include a device that can be used to insert a probe into a filtering facepiece for fit testing. The device preferably includes a holder for the probe; a handle to apply force directly or indirectly to the probe; magnets that assist with alignment of the holder and the handle during a process of inserting the probe into the filtering facepiece; and a spring that facilitates separation of the holder and the handle after insertion of the probe into the filtering facepiece. The holder may further include a needle for puncturing the filtering facepiece to facilitate insertion of the probe. The holder and the handle preferably are separate elements positioned opposite each other to apply force to the probe. In some aspects, the holder includes a piston for driving the probe into the filtering facepiece. The spring may surround the piston. The handle preferably includes a recess capable of holding a fastener for the probe. The magnet(s) may be of any shape and type, but preferably are torus shaped neodymium magnets.

Aspects of the subject technology also included associated techniques.

In more detail, filtering facepiece (variously called face masks, respirators, or filters) are worn to protect a user from particulate challenges. Various ratings are applied to such face masks or filters, for example N95, N99, and N100. The number generally indicates a percentage of particulates such as dust filtered by a filtering facepiece. These types of face masks and filters generally do not protect a user from toxic gasses but are fairly effective against workplace particulates and biological insults which are, by definition, particulate in nature.

Measurement of the fit of the mask or filter to a user's face preferably is accomplished by measuring a ratio of the ambient particulate concentration to that in the breathing zone (i.e., under the filtering facepiece from which a user breathes). This ratio is generally referred to as the "fit factor," and measuring the ratio is generally referred to as "fit testing."

In order to sample the particulate concentration in the breathing zone, a probe may be inserted through the actual structure of the filtering facepiece itself. Unfortunately, any attempt to sample the air in the breathing zone by other means (e.g., a thin tube inserted between the seal of the mask and the wearer's face) disturbs the seal of the filtering facepiece to the user's face.

The probe should be "punched" through the media which forms the filtering facepiece. A very sharp probe or tool to create and opening for a probe must be used to effect this penetration. Most if not all existing probe insertion tools do not include guide(s) and/or other element(s) to protect the operator from being stabbed, ensure proper alignment of the probe with a fastener to hold the probe in place on a filtering facepiece, or even to align the probe properly. Use of such existing tools also tends to require significant effort.

For 20+ years since the inception of the ability to quantitatively fit test a filtering facepiece, the industry has relied on a two-piece hand tool that included a two-piece plastic hand tool. A person had to manually clasp the hand tool in an ergonomically incorrect position and apply force from two hands to insert a probe. This process was cumbersome for nurses and people in general industry to accomplish and also posed a safety risk as nurses often reported for needle sticks due to the probing device.

One example of an existing tool was developed by Frontier Enterprises, a private contractor in Albuquerque, N. Mex. for the US Military in the 1970's. The first quantifiable fit testing method used a hot corn oil challenge aerosol measured by comparing the in-mask concentration to the ambient value. The test apparatus used a flame photometer (FP) that measured the sulfur emission lines of two of the amino acids in corn oil and recorded the result on an analog strip chart recorder (which required about 30 seconds to manually zero). The actual in-exercise measurement usually took 30 seconds, but the whole process usually took 80 seconds or more because of the necessity of measuring ambient concentration between exercises and the extra thirty seconds of time to zero the strip chart recorder.

The aerosolized corn oil chamber was a fixed brick and mortar structure and not portable. "Portable" versions existed, but the whole setup weighed more than 500 pounds. The military wanted something field portable so they contracted TSI in Minneapolis, Minn. to design such an instrument. This lead to the launch of the TSI PORTACOUNT® which is a portmanteau of portable and counter and was ultimately released to industry for resale in 1987.

The original PORTACOUNT® had a non-removable wick and was not particularly user-friendly, but filled a need and was certainly the best solution at that time. Subsequent versions became better but the key factor that made the PORTACOUNT® a global fit testing standard never changed. The PORTACOUNT® offered quantifiable fit testing that used a face seal in a dynamic environment. (i.e., the user is moving during measurement).

As technology and knowledge evolved, current quantifiable fit testing methods started to expose some weaknesses that can be characterized as "accuracy gaps." For example, the original PORTACOUNT® did not make simultaneous measurements of the ambient and mask-sample values. This is still the case, and accuracy suffers as a result of the fairly wide swings in particle count which can occur within seconds in the typical room with a typical HVAC system.

Another approach is a controlled negative pressure (CNP) system. This type of system measures the leak-down rate of a slight negative pressure inside a facepiece filter (i.e., in the breathing zone). This approach does not match what occurs in real life nor does the approach accurately reflect a fit factor since no comparative measurement is involved.

Aspects of the subject technology attempt to address some or all of the foregoing and possibly other issues related to fit testing. The technology is intended to help increase workplace safety and employee health. First, the subject technology shields a person inserting a probe into a filtering facepiece from accidental contact. Second, effort required for probe penetration and fastener seating is significantly lessened. Third, more accurate measurement in more realistic environments is envisioned. The subject technology is not limited to achieving all of these potential benefits and may achieve other benefits.

In some aspects, the subject technology includes a spring loaded device in which a probe is placed in a holder. The probe preferably is made of aluminum. The holder may include a retractable puncturing device such as a needle over which the probe may be fitted. A fastener for the probe may be placed on or in a handle. Examples of a suitable fastener include but are not limited to a grommet, nut, or rivet connector made of a suitable material such as galvanized steel or some other metal.

The handle may include one or more magnets that may be attracted to one or more magnets on the holder for the probe, assisting with proper alignment. Applying force to the holder and the handle (i.e., pushing them together) may insert the probe into a filtering facepiece placed therebetween, preferably piercing and securing the probe in the filtering facepiece via the fastener. A preferably included spring may then assist with removing the holder and the handle from each other while leaving the secured probe in place in the filtering facepiece.

Some examples of the subject technology discussed above are illustrated with respect to the included figures. The subject technology is not limited to these examples.

FIG. 1 illustrates an example of a device that can be used to insert a probe into a filtering facepiece for fit testing according to aspects of the subject technology.

Device 101 that can be used to insert a probe into a filtering facepiece for fit testing includes holder 102 for a probe (not shown in FIG. 1) and handle 103 to apply force directly or indirectly to the probe. Magnets 104 assist with alignment of the holder and the handle during a process of inserting the probe into the filtering facepiece. The magnets may be of any shape and/or type, but preferably are torus shaped neodymium magnets.

Spring 105 facilitates separation of the holder and the handle after insertion of the probe into the filtering facepiece.

As shown in FIG. 1, the holder and the handle preferably are separate elements positioned opposite to each other to apply force to the probe. Both may include shields 106 and 107 intended to protect a user from being harmed during operation of the device.

Holder 102 also preferably includes piston 108 for driving the probe into the filtering facepiece. The spring may surround the piston. Puncturing device 109 such as a needle preferably is attached to the piston. The puncturing device may be used to puncture the filtering facepiece to facilitate insertion of the probe.

In some aspects, handle 103 further includes recess 110 capable of holding fastener 111 for the probe. Again, examples of a suitable fastener include but are not limited to a grommet, nut, or rivet connector made of a suitable material such as galvanized steel or some other metal. The recess preferably also includes an area for receiving the puncturing device.

Figure 2:
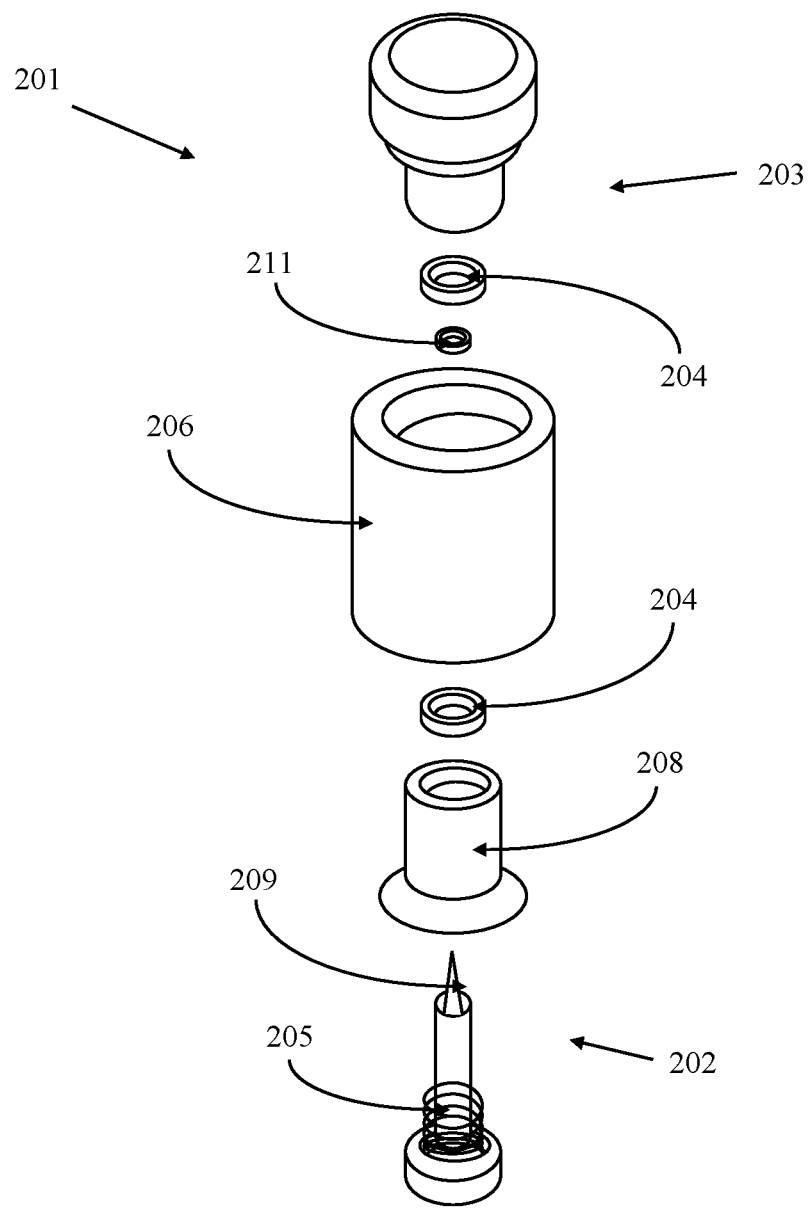
FIG. 2 illustrates an exploded perspective view of a device that can be used to insert a probe into a filtering facepiece for fit testing according to aspects of the subject technology.

FIG. 2 illustrates an exploded perspective view of a device that can be used to insert a probe into a filtering facepiece for fit testing according to aspects of the subject technology. The device illustrated in FIG. 2 is similar to the one illustrated in FIG. 1. However, the device in FIG. 2 is "upside down" compared to the device in FIG. 1 and includes a slightly different arrangement.

Device 201 that can be used to insert a probe into a filtering facepiece for fit testing includes holder 202 for a probe (not shown in FIG. 2) and handle 203 to apply force directly or indirectly to the probe. Magnets 204 assist with alignment of the holder and the handle during a process of inserting the probe into the filtering facepiece. The magnets may be of any shape and/or type, but preferably are torus shaped neodymium magnets.

Spring 205 facilitates separation of the holder and the handle after insertion of the probe into the filtering facepiece.

As shown in FIG. 2, the holder and the handle preferably are separate elements positioned opposite to each other to apply force to the probe. Shield 206 that engages with the holder and the handle is intended to protect a user from being harmed during operation of the device.

Holder 202 also preferably includes piston 208 for driving the probe into the filtering facepiece. The spring may surround the piston. Puncturing device 209 such as a needle preferably is attached to or engages with the piston. The puncturing device may be used to puncture the filtering facepiece to facilitate insertion of the probe.

In some aspects, handle 203 further includes a recess capable of holding fastener 211 for the probe. Again, examples of a suitable fastener include but are not limited to a grommet, nut, or rivet connector made of a suitable material such as galvanized steel or some other metal. The recess preferably also includes an area for receiving the puncturing device.

Figure 3:
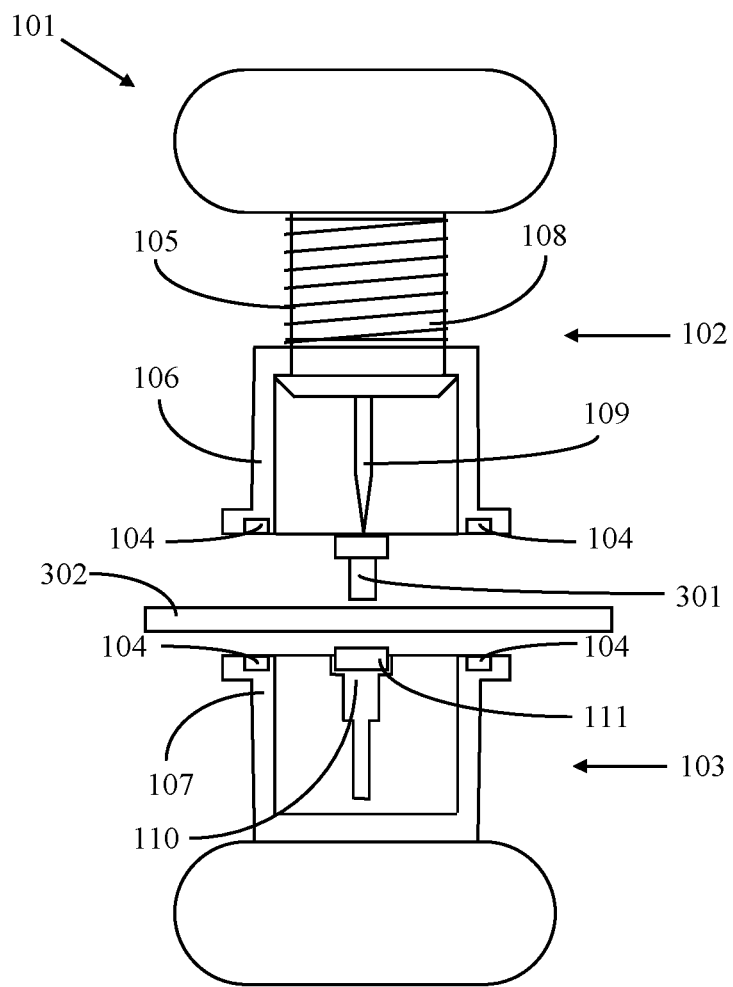
FIG. 3 illustrates an example preparing to insert a probe into a filtering facepiece for fit testing according to aspects of the subject technology.
Figure 4:
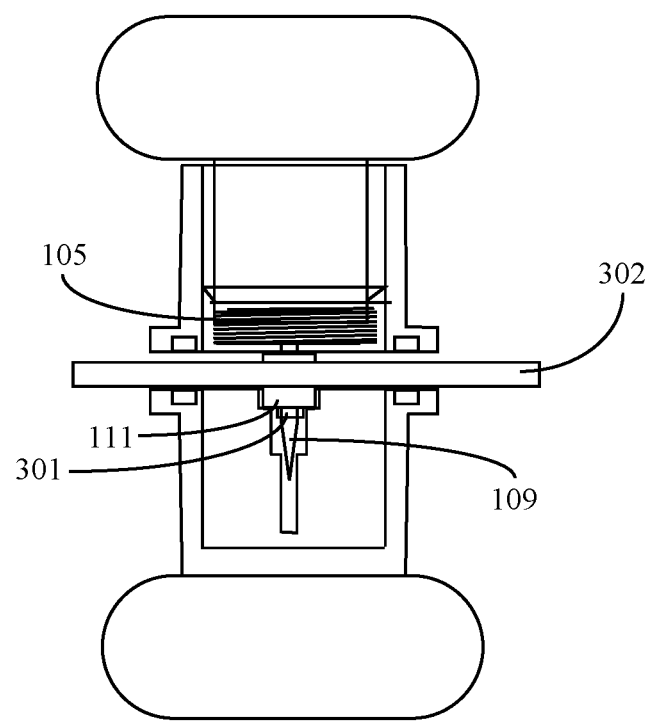
FIG. 4 illustrates an example of a device inserting a probe into a filtering facepiece for fit testing according to aspects of the subject technology.

FIG. 3 illustrates an example preparing to insert a probe into a filtering facepiece for fit testing according to aspects of the subject technology. The elements illustrated in FIG. 3 are identical to the elements illustrated in FIG. 1 except for the addition of probe 301 positioned for insertion into filtering facepiece 302 by pressing holder 102 and handle 103 together. The filtering facepiece may be of any type, for example a disposable N95, N99, or N100 filter. The result of doing so are illustrated in FIG. 4. In this figure, puncturing device 109 has pierced filtering facepiece 302, and probe 301 has been inserted through the puncture to fastener 111. Spring 105 is compressed to facilitate separation of holder 102 and handle 103 after the illustrated operation is complete.

Figure 5:
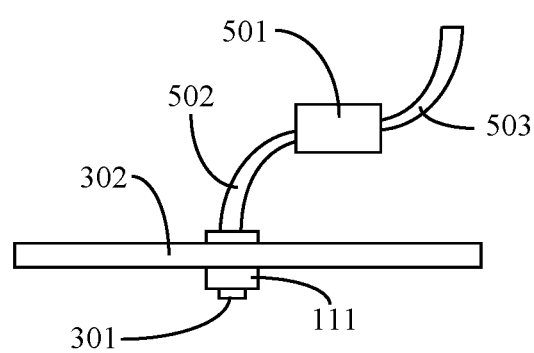
FIG. 5 illustrates fit testing using a probe inserted into a filtering facepiece according to aspects of the subject technology.

FIG. 5 illustrates fit testing using a probe inserted into a filtering facepiece according to aspects of the subject technology. Probe 301 shown inserted into filtering facepiece 302 and held in place by fastener 111. The probe is connected to measuring device 501 (not necessarily shown to scale), for example via tube 502. Thus, the measuring device can detect particulates and the like in a breathing zone when the filtering facepiece is worn. (The bottom part of the illustrated portion of the filtering facepiece is the part worn over a user's nose and mouth.) The measuring device also can sample ambient air, for example via tube 503. Preferably, the measuring device samples air from both the breathing zone and the ambient environment simultaneously. In some aspects, the measuring device is digital and may be connected directly or indirectly to one or more other digital devices such as a computer workstation, server, network, or the like.

The invention is in no way limited to the specifics of any particular embodiments and examples disclosed herein. For example, the terms "aspect," "example," "preferably," "alternatively," and the like denote features that may be preferable but not essential to include in some embodiments of the invention. In addition, details illustrated or disclosed with respect to any one aspect of the invention may be used with other aspects of the invention. Additional elements and/or steps may be added to various aspects of the invention and/or some disclosed elements and/or steps may be subtracted from various aspects of the invention without departing from the scope of the invention. Singular elements/steps imply plural elements/steps and vice versa. Some steps may be performed serially, in parallel, in a pipelined manner, or in different orders than disclosed herein. Many other variations are possible which remain within the content, scope, and spirit of the invention, and these variations would become clear to those skilled in the art after perusal of this application.

What is claimed is:

1. A device that can be used to insert a probe that samples air into a filtering facepiece for fit testing, comprising:
    the probe that samples air;
    a holder for the probe that samples air;
    a handle to apply force directly or indirectly to the probe;
    magnets that assist with alignment of the holder and the handle during a process of inserting the probe into the filtering facepiece; and
    a spring that facilitates separation of the holder and the handle after insertion of the probe into the filtering facepiece.

2. The device as in claim 1, wherein the holder and the handle are separate elements positioned opposite to each other to apply force to the probe.

3. The device as in claim 1, wherein the holder further comprises a piston for driving the probe into the filtering facepiece.

4. The device as in claim 3, wherein the spring surrounds the piston.

5. The device as in claim 1, wherein the holder further comprises a puncturing device to facilitate insertion of the probe.

6. The device as in claim 1, wherein the handle further comprises a recess capable of holding a fastener for the probe.

7. The device as in claim 1, wherein the magnets comprise torus shaped magnets.

8. The device as in claim 1, wherein the magnets comprise neodymium magnets.

* * * * *